:450,492
Patented June 17, 1969

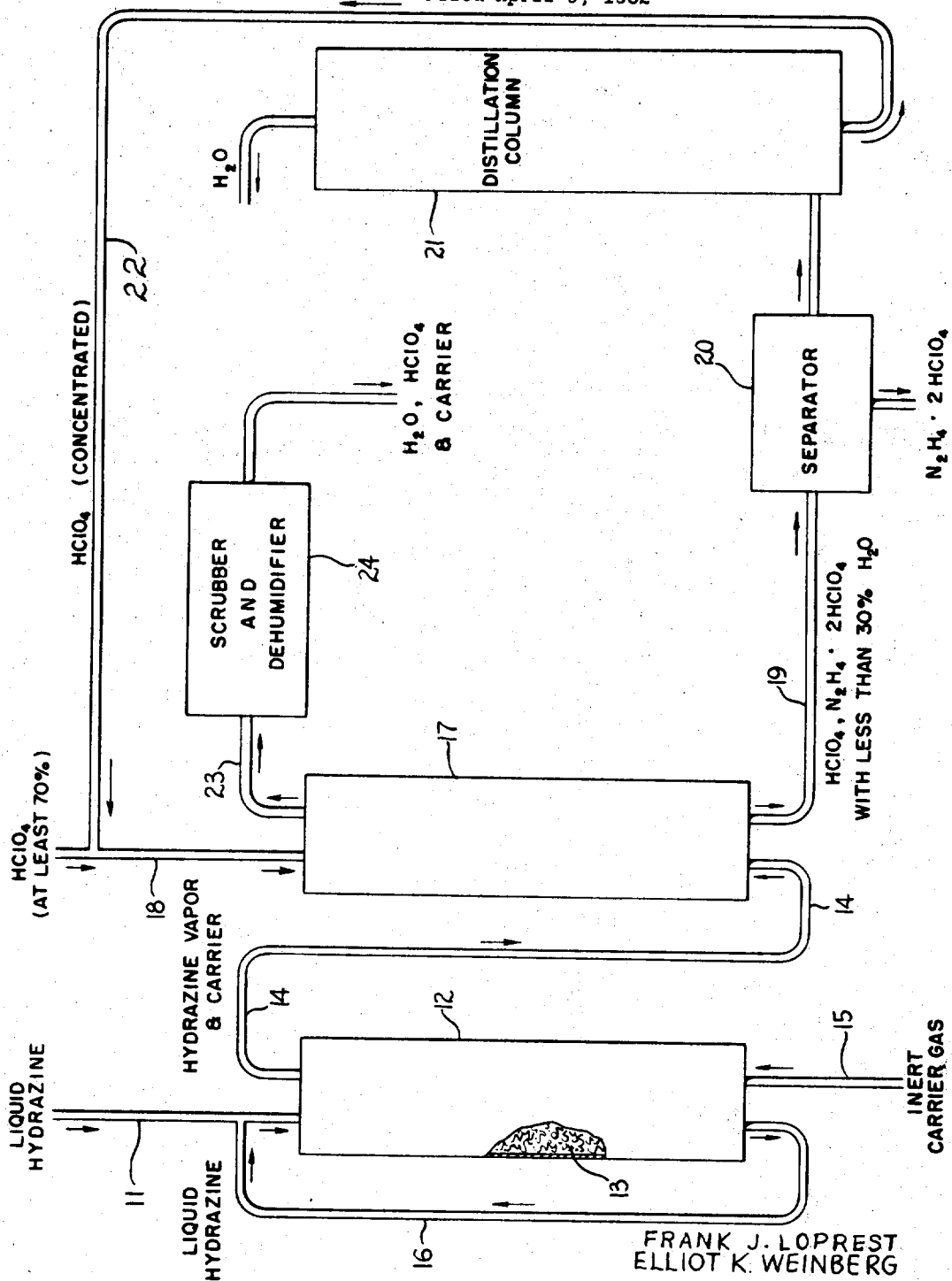

3,450,492
METHOD OF MAKING HYDROZINIUM DIPERCHLORATE
Elliot K. Weinberg, Dover, and Frank J. Loprest, Denville, N.J., assignors to Thiokol Chemical Corporation, Bristol, Pa., a corporation of Delaware
Filed Apr. 3, 1962, Ser. No. 184,888
Int. Cl. C01b 11/18; C06c 1/02
U.S. Cl. 23—85         4 Claims This invention relates to methods of making hydrazinium diperchlorate, and relates in particular to methods of making this material in anhydrous form, substantially free of hydrazinium monoperchlorate.

As disclosed in U.S. Patent 3,006,743, hydrazine diperchlorate ($HP_2$) is of utility as an oxidizer for combination with high energy fuels in the compounding of solid rocket propellants. As disclosed in the aforementioned patent, the $HP_2$ oxidizer is conveniently pulverized and admixed with a polymeric or prepolymeric fuel component, and then cured to form the final propellant composition.

In compounding rocket propellants, it is desirable that hydrazine diperchlorate be employed in anhydrous form to maximize its oxidizing power per unit weight. It has also been found that anhydrous hydrazine diperchlorate substantially free of hydrazine monoperchlorate has a higher density and a lower sensitivity to shock than does diperchlorate contaminated with the monoperchlorate salt. High density permits high loading levels in the propellant chamber of a rocket motor. Low sensitivity is of importance for safety in handling.

Further, it has been found that the production of the pure $HP_2$ salt in a particular crystal form is of advantage in compounding rocket propellant compositions. In particular, when the oxidizing salt is mixed with a liquid polymeric fuel component prior to curing to form a solid propellant grain, the presence of the salt as crystals having a rounded form substantially free of irregular projections greatly facilitates the mixing of the oxidizer and fuel components to form a homogeneous mixture. If the crystals are irregular in shape, interference of the particles with each other, e.g. by frictional rubbing or by interlocking of their irregularities, causes great difficulty in dispersing the solids throughout the liquid component and has heretofore presented substantial manufacturing problems, since heavy duty apparatus capable of stirring the very viscous mixtures must be employed. Also, it is difficult to achieve homogeneity in such very viscous mixtures: undesirable voids and localized non-uniformities in composition may be present in the finished propellant, causing non-uniform burning on ignition. By using the $HP_2$ salt in the form of rounded crystals, according to the present invention, mixing of the oxidizer with the fuel component of the solid propellant being made is greatly facilitated without requirements for special apparatus or unusual limitations as to batch size.

Copending application Ser. No. 184,666 filed on even date herewith teaches a method for preparing hydrated hydrazinium diperchlorate substantially free of the monoperchlorate by combining hydrazine and perchloric acid, such that, critically, the perchloric acid is in excess of the 2:1 molar ratio stoichiometrically necessary for formation of the di-salt. As disclosed in that application, the molar ratio of perchloric acid to hydrazine can range from about 2.05:1 to about 100:1, although it is desirable to keep the ratio to a minimum of 2.86:1 and to a maximum of about 5:1. By using at least the preferred minimum, stripping steps removing volatiles under vacuum can be avoided. By remaining below the preferred maximum, product recovery is simplified, since an excess of perchloric acid must eventually be separated from the salt formed. Under these conditions, hydrated hydrazinium diperchlorate substantially free of the monoperchlorate salt, that is containing less than about 1% by weight of the mono-salt, can be prepared. The hydrated salt can then be dehydrated by various means disclosed in said copending application, e.g. by heating under vacuum.

According to the present invention, it has now been found that if hydrazine and perchloric acid are reacted at temperatures between about 0° C. and about 50° C. in a greater than stoichiometric ratio, as disclosed in the copending application, in amounts and at concentrations such that the concentration of water in the final reaction mixture is less than about 30%, by weight, anhydrous hydrazinium diperchlorate, rather than hydrated hydrazinium diperchlorate, is formed directly, eliminating the subsequent dehydration steps necessary to the method in said copending application.

By eliminating dehydration steps, involving heating, the formation of decrepitated salt products in which the crystals are fractured and irregular is avoided. Smooth, uniform crystals of anhydrous hydrazinium diperchlorate in a form suitable for incorporation with liquid fuel materials to form a solid propellant are formed directly using the methods of the present invention.

To produce systems in which the final reaction mixture contains less than about 30% of water, it is desirable that the hydrazine and/or perchloric acid reacted be as free of water initially as possible. Commercial hydrazine is generally available as an aqueous solution having a concentration of about 54%. Perchloric acid is commercially available in concentrations of about 70%. To combine these materials to obtain reaction mixtures containing less than about 30% by weight of water, the perchloric acid is concentrated by vacuum distillation. Solutions containing 73.6% by weight of acid, corresponding to $$HClO_4 \cdot 2H_2O$$

are suitably used, for example, and reacted with such amounts of aqueous hydrazine as will give reacted systems containing less than 30% of water. Higher yields are obtained if higher acid concentrations, or more concentrated hydrazine solutions, are employed. Hydrazine is also available commercially in anhydrous form and can be reacted as such with perchloric acid. However, the heat evolved in this reaction is large, and the reaction is difficult to control safely.

In combining the reactants, it is convenient first to charge a reaction vessel with concentrated perchloric acid and to add hydrazine or aqueous hydrazine to the reactor at a controlled rate such that the exothermic heat of reaction released by the neutralization is dissipated and the reaction proceeds substantially at room temperatures. Anhydrous hydrazinium diperchlorate substantially free of hydrazinium monoperchlorate (less than 1% by weight) is crystallized from solution, for example by cooling or by evaporation of volatile components from the reaction mixture. The precipitated salt is separated from the mother liquor, conveniently by centrifuging or filtering for example, and dried. The acid component of the reaction mixture can be redistilled and returned to the process.

Since no dehydration of the resulting anhydrous salt is required and no crystal fracturing is experienced, the uniformly shaped crystals produced by the precipitation are directly usable for compounding rocket propellants.

A particularly convenient embodiment of the above-described process involves a heterogeneous 2-phase reaction between hydrazine vapor, with or without an inert carrier gas, and a concentration of perchloric acid.

The use of hydrazine vapors rather than aqueous hydrazine solutions obviates dilution of the system by water added together with the hydrazine. Consequently, commercial perchloric acid of a concentration of about 70%, or perchloric acid solutions only slightly concentrated above this value, can be conveniently employed for neutralization, the resulting reaction mixtures then containing less than about 30% by weight of water and directly producing anhydrous hydrazinium diperchlorate. The resulting system has great operating economy since the heat required for water removal during acid reconstitution after formation of the salt is less per unit weight of salt product formed than is required for processes where water is introduced with the hydrazine. Also, particularly in large scale production, this embodiment introduces additional elements of safety.

A finer degree of control of the amount of hydrazine introduced into the perchloric acid is afforded in a heterogeneous reaction than in a homogeneous reaction using liquid hydrazine. Thus, the amount of hydrazine vapor generated can be regulated by controlling the temperature and pressure during evaporation. Carrier gases diluting the hydrazine vapors may also be used to control the amount of hydrazine to be reacted with perchloric acid. Thus, the rate of heat evolution in the reactor can also be closely controlled to avoid dangerous temperature rises. With a slow reaction, only small amounts of heat are liberated in unit time, and these can be easily dissipated.

An apparatus suitable for carrying out the heterogeneous reaction is shown schematically in the accompanying drawing.

In the figure, liquid hydrazine is fed through line 11 to column 12 containing conventional packing material 13, such as glass rings, promoting the attainment of equilibrium between liquid and gaseous phases. Hydrazine vapor is withdrawn at the top of the column through line 14, in optional admixture with an inert non-condensable carrier gas introduced into column 12 through line 15. Non-vaporized liquid hydrazine is recycled to the column through line 16.

Hydrazine vapors, together with carrier gas, if any, are fed to reactor 17 containing perchloric acid of at least 70% concentration introduced into the reactor through line 18. Spent perchloric acid and anhydrous hydrazinium diperchlorate, in a reaction mixture containing less than 30% of $H_2O$, are removed through line 19, and passed through separator 20 which removes the solid diperchlorate salt (e.g. by filtration). The liquid phase, consisting of perchloric acid and water, is passed to distillation column 21 in which water is removed and concentrated acid recycled through line 22 to column 17.

Exit gas from reactor 17 is suitably passed through scrubbing and dehumidifying unit 24. Carrier gas recovered can be returned to column 12, or discarded. Similarly, water and dissolved $HClO_4$ removed from the exit gas can be discarded or piped to distillation column 21.

As a carrier gas, any inert non-condensing gas can be employed. By "inert" is meant a material not interfering with the neutralization reaction between hydrazine and perchloric acid, e.g. neutral gases, neither basic nor acidic. By "non-condensing" is meant a gas remaining in the vapor phase at the temperature of reaction (around or above room temperature). Air and/or nitrogen are pre-eminently suitable as inert, non-condensing carriers because of their low cost and ready availability. However, numerous other materials such as carbon dioxide, the rare gases, and organic materials such as methane, ethane, propane, etc. could be suitably employed.

A better understanding of the invention and of its many advantages may be had by referring to the following examples, given by way of illustration.

EXAMPLE 1

Anhydrous hydrazinium diperchlorate was prepared in a homogeneous reaction by charging 190 parts by weight of 73.25% perchloric acid and 5.1 parts by weight of 54.4% aqueous hydrazine into a reactor. The resulting reaction mixture contained a total of 141.78 parts of anhydrous hydrazinium diperchlorate and perchloric acid, and 53.32 parts by weight of water (about 27.2% water). A crystalline product precipitated from the reaction mixture which, after drying at 1 mm./Hg at room temperature was analyzed as 100% hydrazinium diperchlorate.

The reaction was repeated employing $HClO_4$ of a concentration of 72.6% and 54.5% hydrazine. The precipitated reaction product was redissolved in the mother liquor by heating, and then recrystallized by cooling. Microscopic examination of the crystals after filtering showed the salt crystals to be uniform and nearly spherical.

EXAMPLE 2

Hydrazine and perchloric acid were reacted in a heterogeneous reaction on a laboratory scale by connecting in series a gas flowmeter, a vessel partially filled with liquid hydrazine and containing a gas dip tube, and another stirred flask partially filled with 73.7% perchloric acid and having a glass dip tube. Nitrogen gas at room temperature was passed through the flowmeter and bubbled through the hydrazine. The hydrazine-nitrogen mixed vapors were then passed into the perchloric acid solution. A white crystalline precipitate formed in this reactor vessel. On filtering, the acid-wet salt analyzed was 91% hydrazinium diperchlorate, indicating the product to be free of water of crystallization.

What is claimed is:
1. The method of making anhydrous hydrazinium diperchlorate substantially free of hydrazinium monoperchlorate which comprises contacting one molar part of hydrazine with more than two molar parts of perchloric acid, the reagents being employed in such amounts and concentrations that the reaction mixture contains less than about 30 percent by weight of water, and then recovering said anhydrous hydrazinium diperchlorate from the resulting mixture.
2. The method as in claim 1 wherein said hydrazine is employed in vapor form.
3. The method of making anhydrous hydrazinium diperchlorate substantially free of hydrazinium monoperchlorate which comprises vaporizing liquid hydrazine, contacting one molar part of the vapors with more than two molar parts of aqueous perchloric acid of a concentration greater than about 70 percent, and then recovering said anhydrous hydrazinium diperchlorate from the resulting mixture.
4. The method as in claim 3 wherein said hydrazine vapors are admixed with an inert non-condensing gas.

References Cited

Audrieth et al., "The Chemistry of Hydrazine," (1951), pp. 167, 168.

Gilbert, "Journal of Am. Chem. Soc.," vol. 53, pp. 3956, 3957, (1931).

Mellor, "A Comprehensive Treatise on Inorganic and Theoretical Chemistry," vol. 2, p. 395 (1947).

BENJAMIN R. PADGETT, *Primary Examiner.*

M. J. McGREAL, *Assistant Examiner.*

U.S. Cl. X.R.

23—190; 149—36